(12) United States Patent
Venables

(10) Patent No.: US 7,814,222 B2
(45) Date of Patent: Oct. 12, 2010

(54) QUEUE STATE MIRRORING

(75) Inventor: Bradley D. Venables, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1324 days.

(21) Appl. No.: 10/742,039

(22) Filed: Dec. 19, 2003

(65) Prior Publication Data

US 2005/0138197 A1  Jun. 23, 2005

(51) Int. Cl.
*G06F 15/173* (2006.01)
*G06F 15/16* (2006.01)

(52) U.S. Cl. .................. 709/232; 709/223; 709/224; 709/230; 709/231; 709/233; 709/234; 709/235

(58) Field of Classification Search ................ None
See application file for complete search history.

(56) References Cited

U.S. PATENT DOCUMENTS

| 5,959,995 | A * | 9/1999 | Wicki et al. ................ 370/400 |
| 6,405,256 | B1 * | 6/2002 | Lin et al. .................... 709/231 |
| 6,721,797 | B1 * | 4/2004 | Kim .......................... 709/232 |
| 7,106,693 | B1 * | 9/2006 | Turner et al. ............... 370/230 |
| 7,111,091 | B2 * | 9/2006 | Lakaniemi et al. ......... 709/233 |
| 7,206,857 | B1 * | 4/2007 | Mammen et al. ........... 709/238 |
| 2002/0059408 | A1 * | 5/2002 | Pattabhiraman et al. ..... 709/223 |
| 2002/0085489 | A1 * | 7/2002 | Sartain et al. .............. 370/229 |
| 2002/0141427 | A1 | 10/2002 | McAlpine |
| 2002/0159758 | A1 * | 10/2002 | Okuyama et al. ............ 386/95 |
| 2003/0053469 | A1 * | 3/2003 | Wentink ..................... 370/412 |
| 2003/0165150 | A1 | 9/2003 | Zimmermann et al. |
| 2003/0198184 | A1 * | 10/2003 | Huang et al. ................ 370/231 |
| 2004/0013124 | A1 * | 1/2004 | Peebles et al. ............. 370/412 |
| 2004/0078438 | A1 * | 4/2004 | Pyle et al. .................. 709/206 |
| 2004/0171383 | A1 * | 9/2004 | Fingerhut et al. ........ 455/435.1 |
| 2005/0013251 | A1 * | 1/2005 | Wang et al. ................ 370/235 |

FOREIGN PATENT DOCUMENTS

EP  1133201 A1  9/2001

OTHER PUBLICATIONS

Jacobs, S. "Real-Time Dynamic Rate Shaping and Control for Internet Video Applications", Mar. 1997, Workshop on Multimedia Signal Processing, pp. 1-6.*
Shinohara, M. et al., "Multiclass Large Scale ATM Switch with QoS Guarantee," Communications, 1997, ICC 97-Montreal, IEEE International Conference, pp. 1-7, (1997).

* cited by examiner

*Primary Examiner*—Hassan Phillips
(74) *Attorney, Agent, or Firm*—Christopher & Weisberg, P.A.

(57) ABSTRACT

A system and method that includes monitoring a state of a physical queue receiving data is shown. The system and method includes generating, queuing, and scheduling messages based on the state of the physical queue, sending the messages to a virtual queue system, and approximating the state of the physical queue in a virtual queue system based on the messages. The system and method includes modifying a transmission rate towards the physical queue based on a state stored in the virtual queue system.

23 Claims, 3 Drawing Sheets

QUEUE STATE MIRRORING

BACKGROUND

A computer system can include a centralized server or service card that provides data to other computers or cards. In such a centralized architecture, the server or service card is connected to multiple physical data channels. In some applications, the centralized server may include the capability to forward data at multiple rates. In order to deliver data to a channel at a rate the channel is capable of receiving, the server or centralized card requires knowledge about the state of the channel and/or a queue associated with the channel.

SUMMARY

In one aspect, a system and method includes monitoring a state of a physical queue receiving data. The system and method also includes generating, queuing, and scheduling messages based on the state of the physical queue, sending the messages to a virtual queue system, and approximating the state of the physical queue in a virtual queue system based on the messages. The system and method also includes modifying a transmission rate towards the physical queue based on a state stored in the virtual queue system.

Embodiments can include one or more of the following. Modifying the transmission rate can include increasing the transmission rate if a fill level of the queue is low and decreasing the transmission rate if a fill level of the queue is high. Decreasing the transmission rate can include setting the transmission rate to zero or setting the transmission rate to a predefined minimum rate. Increasing the transmission rate can include setting the transmission rate to a predefined maximum rate. The maximum rate can be based on a data capacity of a transmission system sending data from the physical queue. The system and method can also include querying the virtual queue system for the approximate state of the physical queue. Monitoring the state of the physical queue can include using a queue monitoring circuit or software program.

The method can also include receiving at the virtual queue system messages associated with the state of a physical queue. The physical queue can inform the queue monitor of changes in the queue state. Monitoring the state of the physical queue can include checking for a change in queue state in response to receiving data addressed to the queue. Checking for a change in physical queue state can occur before the arriving data is put into the queue or after the arriving data is put into the queue.

Generating, queuing and scheduling messages based on the state can include detecting multiple physical queues changing state, prioritizing the state changes, and submitting the state changes as messages to a queuing and scheduling system that transmits the messages to the virtual queue system. Prioritizing the state changes can include deriving the message priority from the shaped rate of the data flow toward the physical queue named in the message. Sending the messages can include sending state messages to the virtual queue system from the queue monitor circuit using a transmission media. The transmission media can include data buses, wires, backplanes, switch fabrics, transmission systems, and the like. Scheduling messages based on the state can include limiting the bandwidth of messages.

The queue monitoring circuit can be co-located with the queue and the virtual queue system can be co-located with the system. The virtual queue system can be located upstream of a transmission media and the physical queue can be located downstream of the transmission media. The transmission media can be a single transmission media carrying data to multiple physical queues. The state of a queue can include a full state, an empty state, a nearly full state, and a nearly empty state. Approximating the state of the physical queue can include approximating a depth of the physical queue based on messages received from a queue monitoring circuit, the transmission rates possible beyond the physical queue, and the transmission rate towards the physical queue. The method can also include providing a state of the virtual queue to an upstream system as if the virtual queue is the physical queue. The method can also include modifying a behavior of the upstream system based on the provided state. Modifying the transmission rate can include having a shaper control circuit or software program with knowledge of the virtual queue system state and the ability to effect a change to the transmission rate. The shaper control circuit and the rate shaper can be co-located with the system.

The method can also include transmitting a signal, message, or instruction to a rate shaper from the shaper control, and transmitting data from the rate shaper at a different rate based on the signal, message, or instruction. The shaper control can interact with the shaper through a flow control methodology to modify an effective shaped rate.

In another aspect, a system includes a monitoring system and a virtual queue system. The monitoring system is configured to monitor a state of a physical queue receiving data.

The monitoring system is also configured to generate, queue and schedule messages based on the state of the physical queue and send the messages to a virtual queue system. The virtual queue system is configured to approximate the state of the physical queue in a virtual queue system based on the messages and modify a transmission rate towards the physical queue based on a state stored in the virtual queue system.

Embodiments can include one or more of the following. The monitoring system can be configured to detect multiple physical queues changing state, prioritize the state changes, and submit the state changes as messages to a queuing and scheduling system that transmits the messages to the virtual queue system. The system can also include an upstream system configured to query the virtual queue system for an approximate state of the physical queue. The system can also include rate shaper circuit configured to transmit a signal, message, or instruction to a rate shaper from the shaper control and transmit data from the rate shaper at a different rate based on the signal, message, or instruction.

In another aspect a computer program product, tangibly embodied in an information carrier, for executing instructions on a processor can be operable to cause a machine to monitor a state of a physical queue receiving data. The computer program product can also include instructions to generate, queue and schedule messages based on the state of the physical queue and send the messages to a virtual queue system. The product can also include instructions to approximate the state of the physical queue in a virtual queue system based on the messages and modify a transmission rate towards the physical queue based on a state stored in the virtual queue system.

Embodiments can include one or more of the following. The computer program product can include instructions to detect multiple physical queues changing state, prioritize the state changes, and submit the state changes as messages to a queuing and scheduling system that transmits the messages to the virtual queue system. The computer program product can include instructions to query the virtual queue system for an approximate state of the physical queue. The computer program product can include instructions to transmit a signal, message, or instruction to a rate shaper from the shaper control and transmit data from the rate shaper at a different rate based on the signal, message, or instruction.

A state monitor sends messages to update a virtual queue when the state of an associated queue changes. The upstream system uses the virtual queue as if it was the associated queue. This provides the advantage of low latency interactions between the upstream system and the queuing system.

A data shaper co-located with the virtual queue alters the data rate leaving the virtual queue system towards the associated queue based on the state of the virtual queue system. This provides the advantage of a stable queue control system and a low messaging bandwidth.

The virtual queue system is co-located with the traffic scheduler and the state monitor is co-located with the real channels. This provides the advantage of reducing interconnect between the system delivering the data and the system receiving the data. Therefore, the number of queues managed in this way can be scaled effectively.

A combination of shaped virtual data channels and a dilated transport media reduce time jitter associated with the update interval of the mirrored queue state.

A state monitor and message scheduling system schedules and sends messages associated with the state of the physical queue to the virtual queue system. This scheduling can reduce the traffic across the transport media and keep the transport media from becoming saturated due to state messages. This allows the bandwidth of the transport media to be managed.

DESCRIPTION

Figure 1:
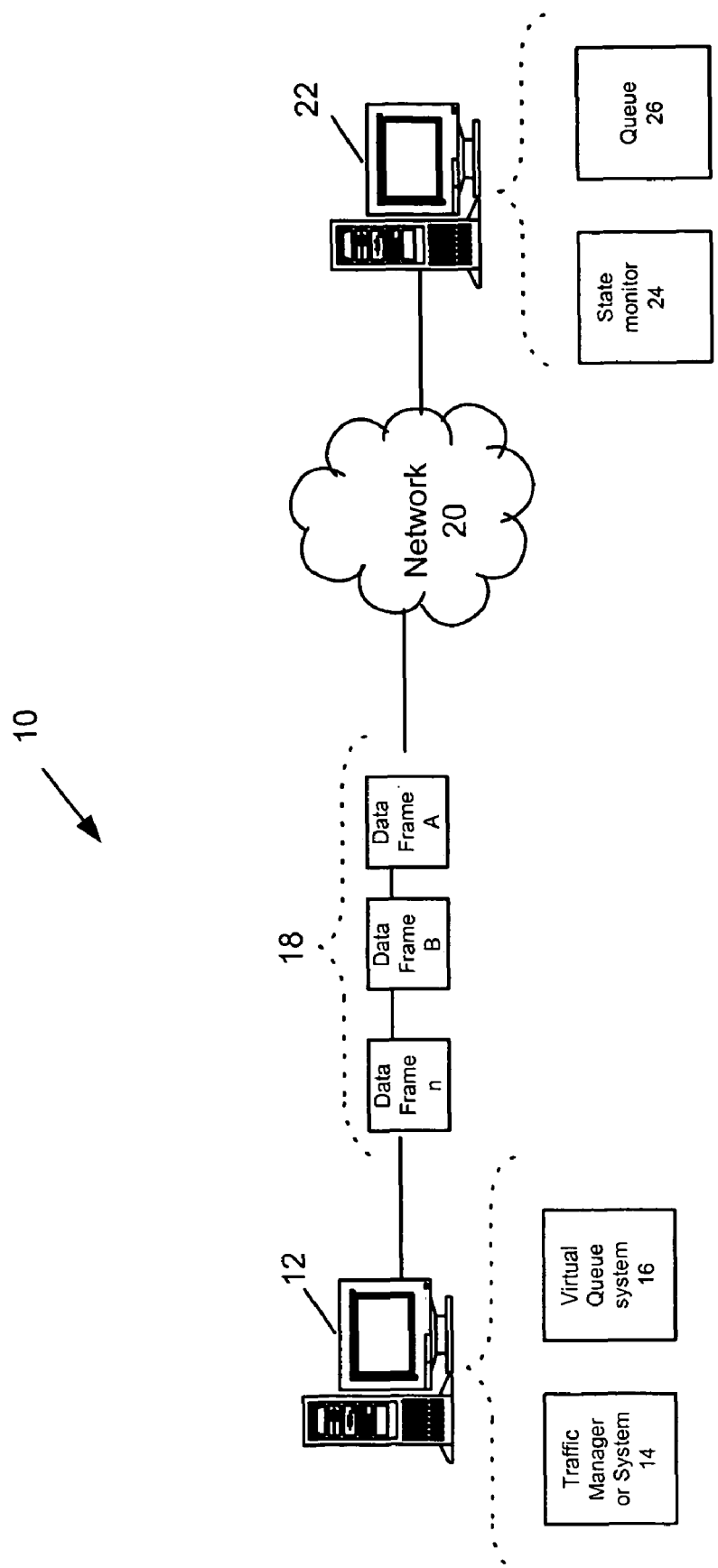
FIG. 1 is a block diagram depicting a system for processing data frames.

Referring to FIG. 1, a system 10 for transmitting data from a first computer system 12 through a network 20 to another computer system 22 is shown. Computer system 12 delivers a stream of "n" data frames 18 to a destination computer system (e.g., computer system 22). To deliver the data to the correct destination at an appropriate rate, the system 12 includes a traffic manager or system 14 and a virtual queue system 16. The virtual queue system 16 maintains a set of mirrored queue states for a queue on the destination computer system (e.g., queue 26 on system 22). The computer system 12 queries the virtual queue system 16 and modifies the data output rate according to the state of the destination queue 26 associated with the data.

While in this example, data is transferred from a first computer system 12 to a destination computer system 22, data could alternately be transferred at a local level among functional units in a backplane. For example, a first card in a backplane transfers data to a second card in the backplane. In this example, alternate transport media such as local connections replace the network, however, the functionality of the system remains similar. In both cases, the virtual queue system resides with the functional unit delivering the data and the state monitor resides with the destination functional unit where the actual queues are located. This provides the benefit of reducing traffic across the network or transport media.

Figure 2:
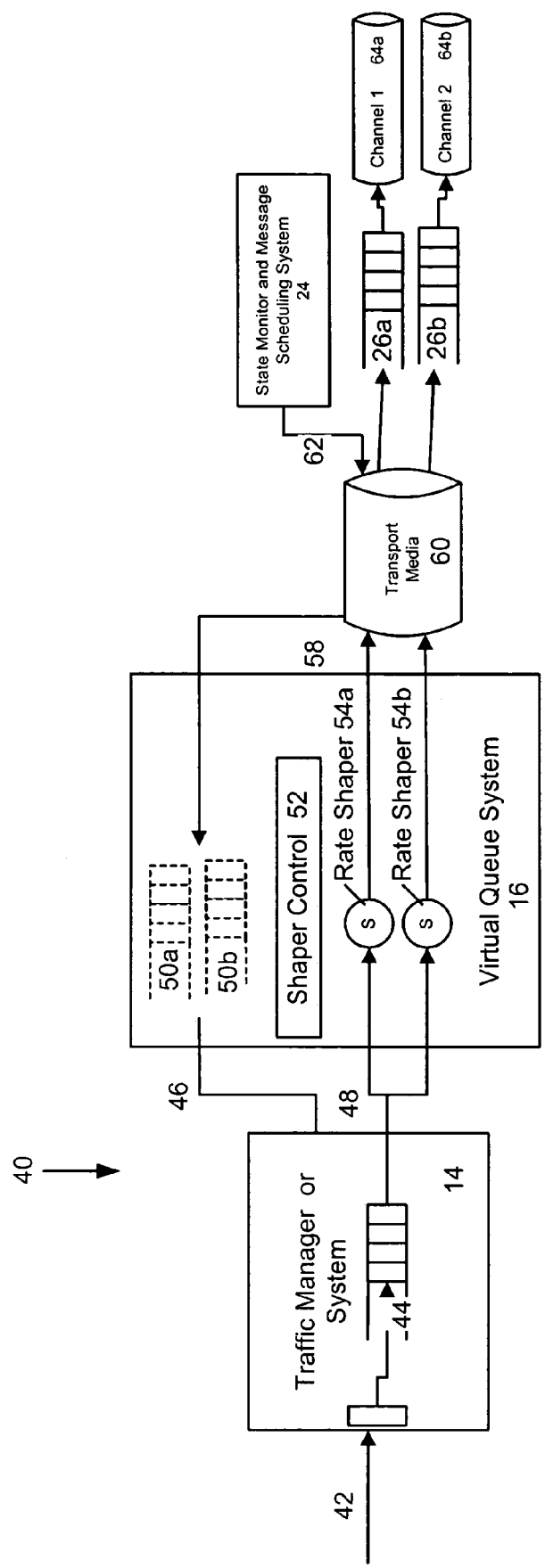
FIG. 2 is a block diagram depicting a virtual queue system.

Referring to FIG. 2, a system 40 for delivering data to the appropriate channel 64 is shown. The system 40 includes a traffic manager or system 14, a virtual queue system 16, transport media 60, a queue state monitor and message scheduling system 24 and physical queues 26a and 26b. The traffic manager or system 14 receives data and delivers the data to the physical queues 26a and 26b. The rate at which the traffic manager or system 14 receives data can differ from the rate that the channels 64 can accommodate. Therefore, the transmission rate can be modified by the rate shaper 54 such that the channels 64a and 64b do not underflow or overflow with data.

In order to provide data to the channels 64a and 64b at the appropriate rate, the traffic manager or system 14 uses information about the state of a queue 26a and 26b associated with the channel 64a and 64b. However, monitoring the state of the queue 26a and 26b directly (i.e., a direct link between the traffic manager or system 14 and each queue 26a and 26b) can be undesirable due the numerous connections required to provide a communications path between each queue and the traffic manager or system 14. Directly queuing the physical queues 26a and 26b can also result in the transmission of a large amount of data over a transport media between the physical queues and the traffic manager or system 14. Accordingly, system 40 includes a virtual queue system 16 that maintains an approximation of the state of the remote queues 26. Thus, traffic manager or system 14 can query the virtual queuing system 16 (e.g., using query bus 46) to obtain knowledge of the state of a particular physical queue, e.g., physical queues 26a and/or 26b. The virtual queue system 16 responds to messages and requests from the traffic manager or system 14 in the same manner as the physical queues 26 would respond. Thus, the behavior of traffic manager or system 14 is not modified for use with the virtual queue system and the traffic manager or system 14 is not aware that a virtual queue system 16 is responding to state requests instead of the physical queues.

In order to maintain an approximation of the state of the physical queues 26 in the virtual queuing system 16, the virtual queuing system 16 is co-located with the computer system 12 that delivers data to the channels 64 and a state monitor and message scheduling system 24 is co-located with the data channels 64 and physical queues 26. A transport media 60 provides a communications path between the physical queues 26 and the virtual queue system 16. For example, the transport media 60 could be a wire connecting the state monitor and message scheduling system 24 and queues 50 of the virtual queuing system 16. Alternately, other transport media such as wireless communications could be used.

The state monitor and message scheduling system 24 uses the arrival of data as a triggering event to search for the state of a channel 64. For example, the state monitor and message scheduling system 24 samples the queue 26 immediately prior to the data being inserted (checking for an empty state) and immediately after the data is inserted (checking for a full state). The state monitor and message scheduling system 24 triggers an event based on the state of the queue if the queue is nearly under flowing (i.e. empty or nearly empty) or nearly overflowing (i.e. full or nearly full). The levels necessary to trigger an event are set by a system designer based on factors such as delay in the transport media and the size of the queue. When an event is triggered, the state monitor and message scheduling system 24 sends a message over the transport media 60 to the virtual queue system 16 (as indicated by arrows 62 and 58). When the queues 26 change state, the state monitor and message scheduling system 24 sends a message to the virtual queue system 16 (i.e. when an event is not triggered in the state monitor and message scheduling system 24 it does not send a message to the virtual queue system 16). Sending only messages triggered by a particular event limits the traffic across the transport media 60. Subsequent to receiving a message from the state monitor and message scheduling system 24, the virtual queue system 16 updates the virtual queues 50a and 50b to reflect the state of the physical queues 26a and 26b such that the virtual queues 50a and 50b maintain an approximation of the state of the physical queues 26a and 26b. Additionally, the queue monitoring system can provide a weighted polling method to ensure that the state of the virtual queues 50 properly mirrors the queues 26. The state monitor and message scheduling system 24 schedules messages associated with the state of the physical queues 26 to be sent to the virtual queue system. By scheduling the messages to be sent at particular times (e.g., times when the transport media 60 is not saturated) or scheduling messages to be sent in bundles, the amount of traffic across the transport media 60 to maintain the state of the queues in the virtual queue system 16 is reduced.

The virtual queue system 16 also includes a shaper control 52 and dynamic shapers 54a and 54b associated with each channel 64a and 64b. The dynamic shapers are capable of two transmission rates. One of the transmission rates is greater than the expected peak data rate and the other of the transmission rates is less than the expected minimum data rate. The closer that the two transmission rates can specified to the actual expected rate, the less control traffic is needed to keep the system stable. The shapers 54 allow the system to manage the amount and rate of data transmitted to the queues 26. The shaping of the channel rate can minimize jitter associated with the system. For example, if the state monitoring system 24 sends a message to the virtual queue system 16 indicating a particular queue is full, the virtual queue system 16 updates the state of the virtual queue and the shaper control 52 updates the rate of the associated shaper 54 (e.g., decreases the rate to a lower rate).

The virtual queue system 14 maintains the virtual queues 50a and 50b. When the traffic manager or system 14 requires knowledge of the data channel transmission rate or the state of a queue, the traffic manager or system 14 queries the virtual queuing system 16 using query bus 46. The state of the shaper control 52 in combination with the mirrored queue state in the virtual queues 50 presents the server with the same response expected from a system in which the server is directly attached to the data channels 64. Subsequent to querying the virtual queue system 16, the traffic scheduler sends data through the rate shaper 54 at a rate adapted to the state of the queue. The rate shaper 54 sends the data to the data channels via the transport media 60. The transport media can provide more capability to transport data than will be used at a single time to increase performance, but, as a minimum the transport media should not be congested to a point of dominating the system jitter.

Figure 3:
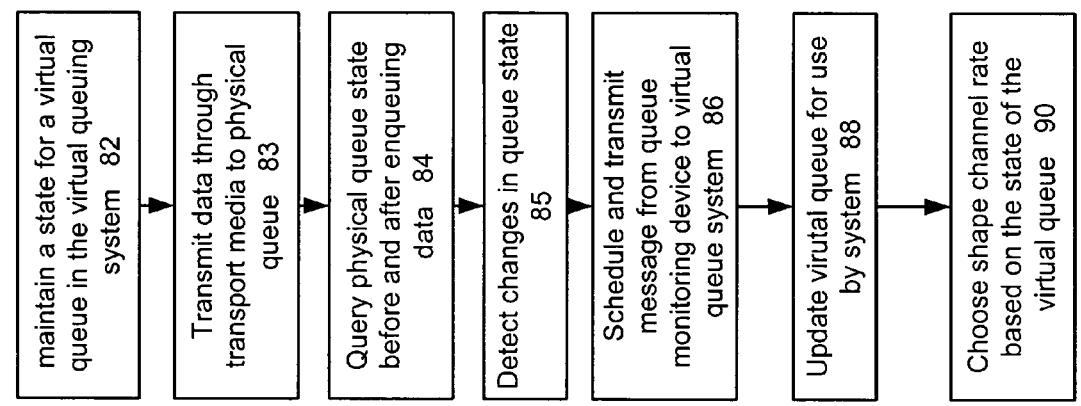
FIG. 3 is a flow chart showing a technique to update and query a virtual queue.

Referring to FIG. 3, a process 80 for mirroring a queue state and adapting a channel rate is shown. Process 80 maintains 82 a state for a mirrored queue in the virtual queuing system. This state is an approximation of the state of the physical queue. Process 80 transmits 83 data through the transport media to the physical queue. Process 80 queries 84 the physical queue state before and after enqueueing the data to the physical queue. This querying can detect 85 changes in the state of the physical queue. Process 80 includes scheduling and transmitting 86 messages from the state monitor and message system 24 to the virtual queue system 16. Process 80 includes updating 88 the virtual queue 50 in the virtual queue system 16 to reflect state changes sent in the messages from the state monitor and message scheduling system 24. An upstream system (e.g., traffic manager or system 14) uses the state of the virtual queues. Process 80 chooses 90 a shaped channel rate based on the state of the virtual queue 50 in the virtual queue system 16.

In one particular embodiment, a system 10 delivers High-level Data Link Control (HDLC) data from system 12 to system 22. The HDLC data has a variable data rate. For example, an HDLC channel with a raw data rate of 1 Mbit/sec only achieves 1 Mbit/sec when the protocol does not have to encode any of the data as it is received into the queue 26. However, if the HDLC data includes any "special" characters, the system encodes the data and possibly adds some additional data decreasing the acceptable transmission rate, for example to 995 Kbit/sec. Thus, if the traffic manager or system 14 sends data to the queue 26 at a transmission rate of 1 Mbit/sec, the queue keeps up only if no data is encoded. If the system 22 encodes the data, the queue is not able to keep up with the delivery of the data and the queue will overflow. In previous systems, to ensure the queue does not overflow the transmission rate is set to a lower value (e.g. 950 Kbit/sec) such that even if data is encoded the queue will be able to keep up. However, when data is not encoded this will unnecessarily delay the data transmission.

In this example, a state monitor and message scheduling system 24 monitors the state of the queue 26. If the queue initially receives data at the maximum rate of 1 Mbit/sec and is not full, the shaper control 52 in the virtual queuing system 16 maintains the shaped rate of 1 Mbit/sec for this channel. If the channel subsequently receives a set of data that requires encoding, the queue 26 fills. The state monitor and message scheduling system 24 triggers an event and sends a message to the virtual queue system 16.

The virtual queue system 16 updates the state of the virtual queue 50. When the traffic scheduler queries the virtual queue and determines the queue is full, a shaper 52 decreases the rate of the data transmission for that particular channel 64.

For example, the shaper may be capable of transmitting at 100% or 80% of the optimal 1 Mbit/sec rate. Thus, when the queue 26 is queried and the state is full, the shaper control 52 switches the rate shaper 42 from the 1 Mbit/sec to the lesser transmission rate of 800 Kbit/sec. This allows the queue 26 to process the data without overflowing. When the state monitor and message scheduling system 24 monitors the queue 26 to be empty or almost empty, the state monitor and message scheduling system 24 sends a message to the virtual queue system 16 and the transmission rate is switched back to the full 1 Mbit/sec.

While in the above examples, the shaper is included in the virtual queue system 16, the shaper 52 could be located elsewhere in the computer system 12. For example, the traffic scheduler could include the shaper 52.

While in this example each shaper is capable of transmission at two rates, the shapers can be configured to transmit at multiple rates. For example the virtual queue could have four states: full, almost full, almost empty, and empty. The shaper associates a transmission rate with each of the states. On the extreme, when the queue is "full" the shaper can stop transmission entirely and when the queue is "empty" the shaper can allow a maximum transmission rate. For the "almost full" and "almost empty", a transmission rate between 0 and the maximum can be used.

The systems described herein can be implemented in digital electronic circuitry, in computer hardware, firmware, software, or in combinations of them. The systems described herein can be implemented as a computer program product, i.e., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims.

What is claimed is:

1. A method for removing effects of transmission and flow control latency between a transmitting computer system and a destination computer system on a plurality of physical queues, the method comprising:
   maintaining a virtual queue system in the transmitting computer system, the virtual queue system including a set of virtual queues and a set of virtual queue states which mirror physical queue states of the plurality of physical queues in the destination computer system, the set of virtual queues responding to requests from the transmitting computer system in the same manner as the plurality of physical queues respond;
   receiving a message at the virtual queue system, the message associated with a change in a physical queue state in response to an amount of data in at least one of the physical queues reaching a predetermined level;
   approximating the physical queue state based on the message received by the virtual queue system;
   updating a virtual queue state to the approximated physical queue state; and
   modifying a data transmission rate to the physical queue based on the set of virtual queue states to avoid physical queue data underflow and overflow.

2. The method of claim 1 wherein modifying the data transmission rate includes increasing the data transmission rate if a fill level of the physical queue is below a first level.

3. The method of claim 1 wherein modifying the data transmission rate includes decreasing the data transmission rate if a fill level of the physical queue is above a second level.

4. The method of claim 1 further comprising receiving a query for the approximate physical queue state.

5. The method of claim 1 further comprising:
   receiving in the virtual queue system the change in the physical queue state from a plurality of physical queues as a prioritized message.

6. The method of claim 5 wherein prioritizing the change in the physical queue state includes deriving the message priority from a shaped rate of the data flow toward the physical queue named in the message.

7. The method of claim 1 wherein receiving a message includes receiving a message using a transmission media.

8. The method of claim 1 wherein receiving a message includes limiting a bandwidth of the message.

9. The method of claim 1, wherein approximating the physical queue state includes sampling the physical queue before inserting data in the physical queue and after inserting data in the physical queue, and sending a message to the virtual queue system if the state of the physical queue is one of a full, an empty, a nearly full and a nearly empty state.

10. The method of claim 1 wherein approximating the change in the physical queue state includes approximating the physical queue depth based on messages received from a queue monitoring circuit, a data transmission rate possible beyond the physical queue, and a data transmission rate towards the physical queue.

11. The method of claim 1 further comprising providing an approximate physical queue state from the virtual queue system to an upstream system.

12. The method of claim 11 further comprising modifying a behavior of the upstream system based on the provided physical queue state.

13. The method of claim 1 wherein modifying the data transmission rate includes the virtual queue system having one of a shaper control circuit and a software program with information of the virtual queue system and the ability to effect a change to the data transmission rate.

14. The method of claim 13 further comprising
   transmitting a signal, message, or instruction to a rate shaper from the shaper control circuit; and
   transmitting data from the rate shaper at a different rate based on the signal, message, or instruction.

15. The method of claim 1, wherein the messages are scheduled to be sent at a particular time to avoid data congestion.

16. A system for removing effects of transmission and flow control latency between a transmitting computer system and a destination computer system on a plurality of physical queues, comprising:
   the transmitting computer system including a virtual queue system, the virtual queue system including:
   a set of virtual queues and a set of virtual queue states which mirror physical queue states of a plurality of physical queues in the destination computer system, the set of virtual queues responding to requests from the transmitting computer system in the same manner as the plurality of physical queues respond; and
   an input to receive messages, the messages based on the state of a physical queue and the messages scheduled for receipt;
   a circuit configured to approximate the state of the physical queue by approximating a physical queue depth based on the messages received by the virtual queue system, update a virtual queue state to the approximated physical queue state, and to modify a data transmission rate to the physical queue based on the set of virtual queue states to avoid physical queue data underflow and overflow.

17. The system of claim 16, further comprising a monitoring system wherein the monitoring system is further configured to:
   detect multiple physical queues changing state,
   prioritize the state changes, and
   submit the state changes as messages to a queuing and scheduling system that transmits the messages to the virtual queue system.

18. The system of claim 16 further comprising an upstream system configured to query the virtual queue system for an approximate state of the physical queue; wherein the circuit approximates the state of the physical queue by sampling the physical queue before inserting data in the physical queue and after inserting data in the physical queue, and sending a message to the virtual queue system if the state of the physical queue is one of a full, an empty, a nearly full and a nearly empty state.

19. The system of claim 16 further comprising a rate shaper circuit configured to:
   transmit a signal, message, or instruction to a rate shaper from the shaper control circuit; and
   transmit data from the rate shaper at a different rate based on one of the signal, message, and instruction.

20. A computer program product, tangibly embodied in a non-transitory computer storage medium, for executing instructions on a processor, the computer program product being operable to cause a machine to remove effects of transmission and flow control latency between a transmitting computer system and a destination computer system on a plurality of physical queues, the program product operating to:

receive a message at a virtual queue system in the transmitting computer system, the virtual queue system including a set of virtual queues and a set of virtual queue states which mirror physical queue states of the plurality of physical queues in the destination computer system, the set of virtual queues responding to requests from the transmitting computer system in the same manner as the plurality of physical queues respond, the message associated with a change in a physical queue state in response to an amount of data in at least one of the physical queues reaching a predetermined level;

approximate the state of the physical queue based on the messages received by the virtual queue system;

update a virtual queue state to the approximated physical queue state; and modify a data transmission rate to the physical queue based on the set of virtual queue states to avoid physical queue data underflow and overflow.

21. The computer program product of claim 20 further comprising instructions to detect multiple physical queues changing state, prioritize the state changes, and submit the state changes as messages.

22. The computer program product of claim 20 further comprising instructions to query the virtual queue system for an approximate state of the physical queue, wherein the instructions include sampling the physical queue before inserting data in the physical queue and after inserting data in the physical queue, and sending a message to the virtual queue system if the state of the physical queue is one of a full, an empty, a nearly full and a nearly empty state.

23. The computer program product of claim 20 further comprising instructions to:

transmit a signal, message, or instruction to a rate shaper from the shaper control; and transmit data from the rate shaper at a different rate based on the signal, message, or instruction.

* * * * *